United States Patent
Park et al.

(10) Patent No.: US 8,685,590 B2
(45) Date of Patent: Apr. 1, 2014

(54) SYSTEM FOR PRE-ACTIVATION OF POLYMER ELECTROLYTE FUEL CELL (PEFC)

(75) Inventors: Gu-Gon Park, Daejeon (KR); Minjin Kim, Daejeon (KR); Young-Jun Sohn, Daejeon (KR); Young-Woo Choi, Cheongju-si (KR); Seok-Hee Park, Daejeon (KR); Sung-Dae Yim, Daejeon (KR); Tae-Hyun Yang, Daejeon (KR); Young-Gi Yoon, Daejeon (KR); Won-Yong Lee, Daejeon (KR); Chang-Soo Kim, Incheon (KR)

(73) Assignee: Korea Institute of Energy Research, Daejeon (KR)

( * ) Notice: Subject to any disclaimer, the term of this patent is extended or adjusted under 35 U.S.C. 154(b) by 587 days.

(21) Appl. No.: 13/007,162

(22) Filed: Jan. 14, 2011

(65) Prior Publication Data

US 2011/0236774 A1   Sep. 29, 2011

(30) Foreign Application Priority Data

Mar. 29, 2010   (KR) .................. 10-2010-0027836

(51) Int. Cl.
*H01M 8/10* (2006.01)
*H01M 8/24* (2006.01)
*H01M 4/88* (2006.01)
*C08J 5/00* (2006.01)

(52) U.S. Cl.
USPC ............. 429/483; 429/465; 429/535; 29/738; 264/241; 264/331.11

(58) Field of Classification Search
None
See application file for complete search history.

(56) References Cited

U.S. PATENT DOCUMENTS

| | | | | |
|---|---|---|---|---|
| 5,869,202 A | * | 2/1999 | Marchetti | 429/524 |
| 7,608,118 B2 | * | 10/2009 | Anderson | 29/623.2 |
| 2011/0236801 A1 | * | 9/2011 | Fujiki et al. | 429/535 |

* cited by examiner

*Primary Examiner* — John S Maples
(74) *Attorney, Agent, or Firm* — The Webb Law Firm (57) ABSTRACT

An apparatus for pre-activation of a polymer electrolyte fuel cell includes a first plate and a second plate hot pressing the unit cell stack, each having a flow channel supplying water vapor to opposing inner surfaces with the unit cell stack therebetween and including a resistor producing heat, a compressor, a temperature controller and a water vapor supplier connected to the flow channels of the plates. The apparatus for pre-activating a polymer electrolyte fuel cell may be used to prepare a prep-activated integrated body of a polymer electrolyte fuel cell membrane electrode assembly and gas diffusion layers by performing hot pressing while supplying water vapor to the unit cell stack to hydrate the polymer electrolyte membrane. And the apparatus for pre-activating a polymer electrolyte fuel cell is used to monitor physical damage of the membrane electrode assembly based on the change of degree of vacuum at a fuel electrode side and an air electrode side using, thereby detecting the leaking membrane electrode assembly in advance.

19 Claims, 11 Drawing Sheets

FIG. 1

PRIOR ART

FIG. 2

PRIOR ART

SYSTEM FOR PRE-ACTIVATION OF POLYMER ELECTROLYTE FUEL CELL (PEFC)

CROSS-REFERENCE TO RELATED APPLICATIONS

This application claims priority under 35 U.S.C. §119 to Korean Patent Application No. 10-2010-0027836, filed on Mar. 29, 2010 in the Korean Intellectual Property Office, the disclosure of which is incorporated herein by reference in its entirety.

TECHNICAL FIELD

The following disclosure relates to an apparatus for pre-activation of a polymer electrolyte fuel cell capable of supplying water vapor while hot pressing a unit cell stack with gas diffusion layers stacked on both sides of a membrane electrode assembly before assembling a polymer electrolyte fuel cell stack.

BACKGROUND

A fuel cell is a device that generates electricity by electrochemical reaction between hydrogen included in a hydrocarbon-based fuel such as methanol, natural gas, liquefied petroleum gas, etc. and oxygen included in air. It is highly esteemed as one of clean, next-generation power-generating systems. The fuel cells are divided into phosphoric acid fuel cells, molten carbonate fuel cells, solid oxide fuel cells, polymer electrolyte fuel cells, alkaline fuel cells, or the like. Basically, these fuel cells operate based on the same principle.

Among them, the polymer electrolyte fuel cell [PEFC, also known as proton exchange membrane fuel cell (PEMFC)] is more efficient and provides higher current density and power density than other fuel cells. In addition, with such advantages as fast startup and fast response to load change, it is widely applicable as power source of zero-emissions vehicles, private power generation, and mobile or military applications.

Figure 1:
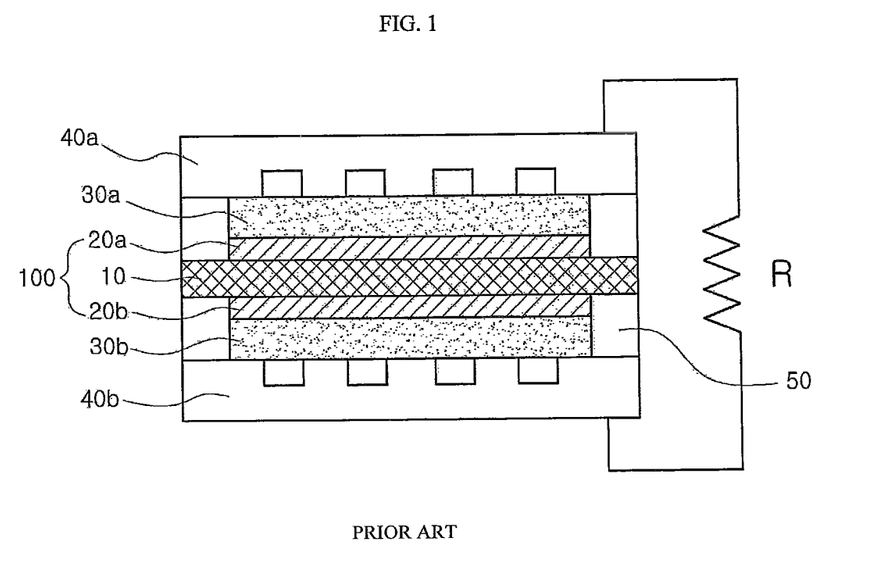
FIG. 1 shows a basic configuration of a fuel cell.

Referring to FIG. 1, a polymer electrolyte fuel cell has a membrane electrode assembly (MEA) 100 in its innermost location. The membrane electrode assembly 100 consists of a polymer electrolyte membrane 10 capable of conducting protons, and electrode catalyst layers applied on both sides of the polymer electrolyte membrane 10 to allow reaction of oxygen and hydrogen, i.e. a cathode 20b and an anode 20a. At the outer portion of the membrane electrode assembly 100, i.e. at the outside of the cathode 20b and the anode 20a, are provided gas diffusion layers (GDLs) 30a, 30b. And, separators 40a, 40b equipped with flow channels to allow supply of fuel and discharge of water produced by the reaction are provided outside the gas diffusion layers 30a, 30b.

At the anode 20a of the fuel cell, hydrogen is oxidized and, as a result, a proton and an electron are produced. The proton and the electron travel to the cathode 20b through the polymer electrolyte membrane 10 and a wire, respectively. Simultaneously, at the cathode 20b, oxygen is reduced by accepting the proton and the electron from the anode 20a to produce water. Electrical energy is generated by the electron traveling through the wire and the proton traveling through the polymer electrolyte membrane 10.

A gasket 50 is provided to prevent leakage of hydrogen and oxygen.

A fuel electrode which contacts hydrogen comprises the anode 20a and the gas diffusion layer 30a provided beside the anode 20a, and an air electrode which contacts oxygen or air comprises the cathode 20b and the gas diffusion layer 30b provided beside the cathode 20b.

Figure 2:
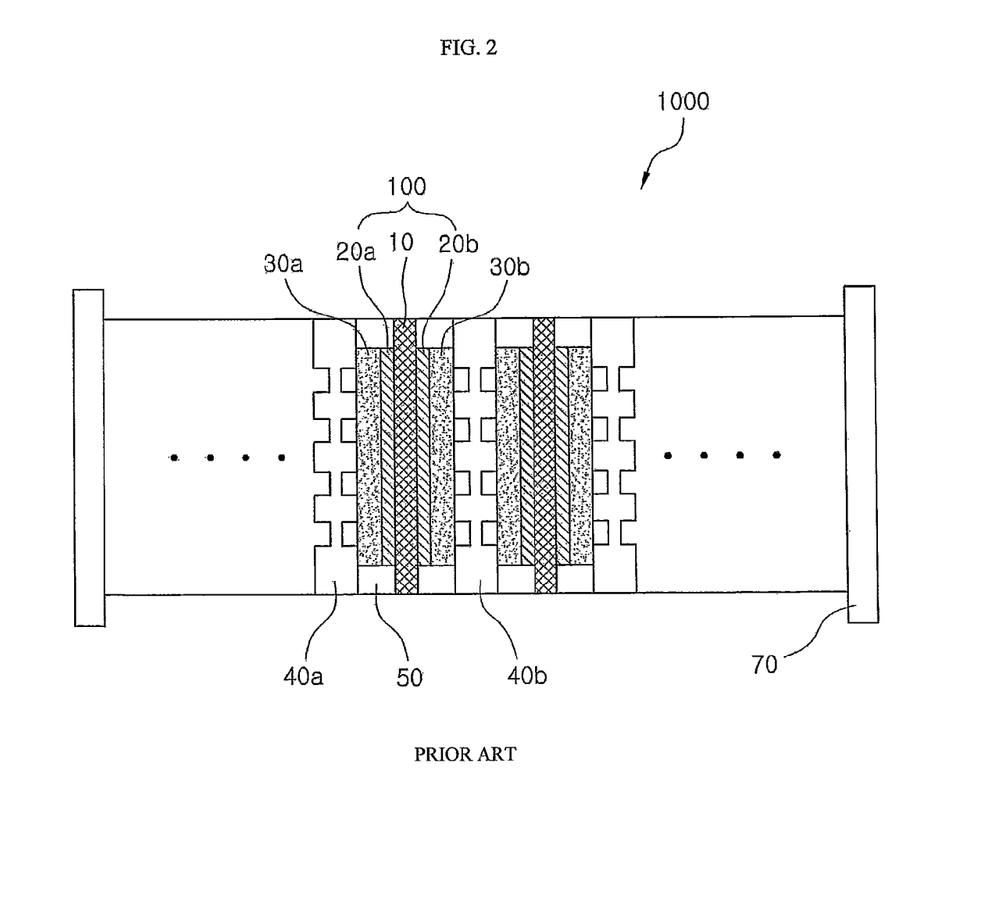
FIG. 2 is a cross-sectional view schematically showing a polymer electrolyte fuel cell stack according to the conventional art.

Since a polymer electrolyte fuel cell used in vehicles requires a higher voltage, the fuel cell units need to be stacked to produce appreciable voltage level. FIG. 2 schematically shows a polymer electrolyte fuel cell stack formed thereby.

FIG. 2 is a cross-sectional view schematically showing a polymer electrolyte fuel cell stack 1000 according to the conventional art.

Referring to FIG. 2, the polymer electrolyte fuel cell stack 1000 comprises one or more fuel cell unit(s) comprising the membrane electrode assembly 100, the gas diffusion layers 30a, 30b and the separators 40a, 40b and end plates 70 provided at the outermost portion of the fuel cell stack.

The stack 1000 comprises one or more of the fuel cell unit(s) stacked with the membrane electrode assembly 100 and the gas diffusion layers 30a, 30b between the separators 40a, 40b and the end plates 70 attached on either side of the outermost separators of the fuel cell stack.

A (+) or (−) terminal is formed on the end plate 70.

The fuel electrode and the air electrode of the polymer electrolyte fuel cell are fabricated from a mixture of a proton conductor such as Nafion and a catalyst such as platinum. When the polymer electrolyte fuel cell is fabricated and then operated initially, its activity may decrease.

It is because, first, the reactants cannot reach the catalyst due to the blocked path for a reactant, second, the proton conductor, such as Nafion, forming a triple phase boundary with the catalyst is not easily hydrated in the early stage of operation, third, continuous transport of protons and electrons in not ensured, and, fourth, impurities included during the fabrication of the electrodes result in decreased catalyst activity.

For these reasons, in order to ensure the best performance of the polymer electrolyte fuel cell, the procedure of activation is necessary after combining the polymer electrolyte fuel cell stack using the membrane electrode assembly and the separators.

The activation is carried out to activate the catalyst which does not participate in the electrochemical reaction and sufficiently hydrate the polymer electrolyte membrane and electrolytes included in the electrodes to increase mobility of protons.

The activation performed to ensure the best performance of the polymer electrolyte fuel cell stack after assembling of the stack may take hours or days depending on the operation condition. An inappropriate activation may not ensure best performance of the fuel cell.

Such an inappropriate activation leads to decreased production rate in mass production of the polymer electrolyte fuel cell and consumption of a large quantity of hydrogen. As a result, the unit cost of the stack increases and the performance of the stack is degraded.

In general, the activation of the polymer electrolyte fuel cell is performed by load variation such as constant-voltage/constant-current cycles, according to instructions characterized by the manufacturers of the corresponding membrane electrode assembly and stack.

Usually, the activation is performed for hours depending on the activation condition of the polymer electrolyte fuel cell stack. This becomes an obstacle to mass production of the polymer electrolyte fuel cell. The number of stacks that can be produced in unit time is restricted since the stack has to remain on the conveyor line for hours during the activation procedure.

In addition, considerable time, hydrogen, air, equipments and labor are required to activate the stacks, each comprising tens to hundreds of the fuel cell units.

Especially, if the activation of the stack is performed soon after the assembling, more time and energy may be consumed because it is difficult to provide a sufficiently humid condition and an electrical load with the stack being equipped in the fuel cell system.

In order to improve the stack productivity, a plurality of stacks may be activated at the same time using a plurality of activation apparatuses. However, this inevitably increases investment in facilities and the production cost.

Meanwhile, if leakage resulting from the physical damage of the membrane electrode assembly is detected after the assembling of the stack, the stack should be disassembled and the corresponding membrane electrode assembly has to be replaced, which is not a simple task.

SUMMARY

An embodiment of the present invention is directed to providing an apparatus for pre-activating a polymer electrolyte fuel cell capable of performing pre-activation and arranging and fixing of a membrane electrode assembly and gas diffusion layers at the same time before assembling a polymer electrolyte fuel cell stack, thereby reducing time and energy required for activation of the final polymer electrolyte fuel cell stack and reducing stack production time.

An embodiment of the present invention is also directed to allowing to monitor physical damage of the membrane electrode assembly based on the change of degree of vacuum at a fuel electrode side and an air electrode side using the apparatus for pre-activating a polymer electrolyte fuel cell, thereby detecting the leaking membrane electrode assembly in advance before assembling the stack.

In one general aspect, the present invention provides an apparatus for pre-activating a polymer electrolyte fuel cell, which supplies water vapor while hot pressing a unit cell stack with gas diffusion layers stacked on both sides of a membrane electrode assembly including a polymer electrolyte membrane provided between two electrode catalyst layers to arrange and fix the membrane electrode assembly and the gas diffusion layers and perform pre-activation at the same time.

The apparatus for pre-activating a polymer electrolyte fuel cell may include: a first plate and a second plate hot pressing the unit cell stack, each having a flow channel supplying water vapor to opposing inner surfaces with the unit cell stack therebetween and including a resistor producing heat in response to an electrical signal; a compressor connected to the first plate or the second plate and applying a pressure to the first plate or the second plate; a temperature controller connected to the resistors and controlling the temperature of the first plate and the second plate; and a water vapor supplier connected to the flow channels of the first plate and the second plate and supplying water vapor.

The water vapor supplier may include a water vapor generator generating water vapor and connection pipes respectively connecting the water vapor generator to the flow channels of the first plate and the second plate and supplying the water vapor generated from the water vapor generator to the flow channels of the first plate and the second plate, and the apparatus for pre-activating a polymer electrolyte fuel cell may include valves regulating the pressure of the connection pipes.

Each of the flow channels of the first plate and the second plate may have one or more water vapor discharge port(s) discharging water vapor to the inner surface and further may have a first discharge port in addition to the one or more water vapor discharge port(s), and the first discharge port may be connected to a vacuum pump via a vacuum pipe equipped with a vacuum valve.

The apparatus for pre-activating a polymer electrolyte fuel cell may further include a sealer sealing the space on either side of the polymer electrolyte membrane, where the electrode catalyst layer and the gas diffusion layers of the unit cell stack are stacked during the hot pressing, at the inner surface of the first plate and the second plate.

The apparatus for pre-activating a polymer electrolyte fuel cell may further include a controller controlling the compressor, the temperature controller and the water vapor supplier.

The pre-activation may include removal of impurities included during the preparation of the membrane electrode assembly and hydration of the polymer electrolyte membrane included in the membrane electrode assembly and electrolytes to increase mobility of proton.

The temperature of the first plate and the second plate during the hot pressing may be 70 to 150° C., the pressure applied by the compressor may be 10 to 200 atm based on the active area of the membrane electrode assembly, and the hot pressing may be performed for 1 to 20 minutes.

In another general aspect, the present invention provides an integrated body of a polymer electrolyte fuel cell membrane electrode assembly and gas diffusion layers pre-activated using the apparatus for pre-activating a polymer electrolyte fuel cell according to the present invention.

In another general aspect, the present invention provides a polymer electrolyte fuel cell stack assembled by stacking a plurality of the integrated bodies of the membrane electrode assembly and the gas diffusion layer.

The apparatus for pre-activating a polymer electrolyte fuel cell according to the present invention arrange and fix the membrane electrode assembly and the gas diffusion layers and perform pre-activation at the same time before assembling the polymer electrolyte fuel cell stack, thereby removing impurities included during the preparation of the membrane electrode assembly and hydrating the polymer electrolyte membrane included in the membrane electrode assembly and the electrolytes to increase mobility of proton.

Further, by assembling the polymer electrolyte fuel cell stack using the pre-activated integrated body of the membrane electrode assembly and the gas diffusion layers, time and energy required for activation of the stack may be saved.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Hereinafter, an apparatus for pre-activating a polymer electrolyte fuel cell according to the present invention will be described in detail with reference to the accompanying drawings.

Figure 3:
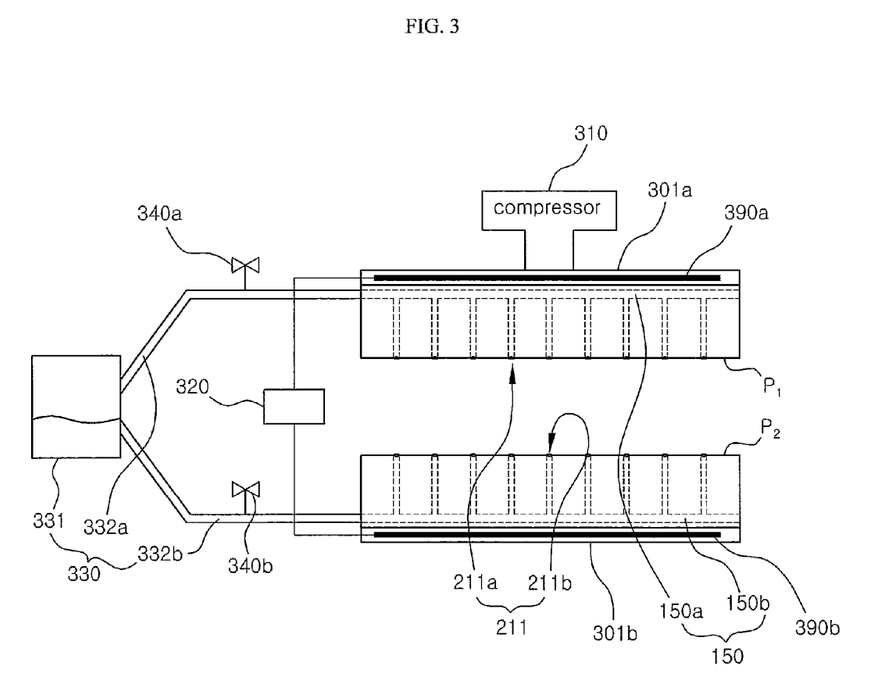
FIG. 3 shows an apparatus for pre-activating a polymer electrolyte fuel cell according to an embodiment of the present invention.
Figure 4:
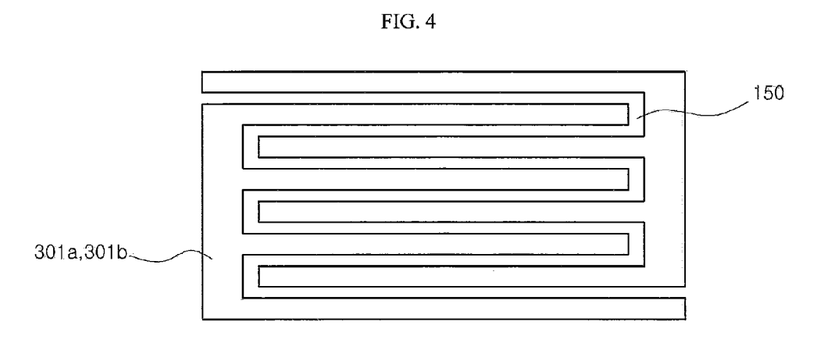
FIG. 4 is a plan view showing a flow channel supplying water vapor according to an embodiment of the present invention.
Figure 5:
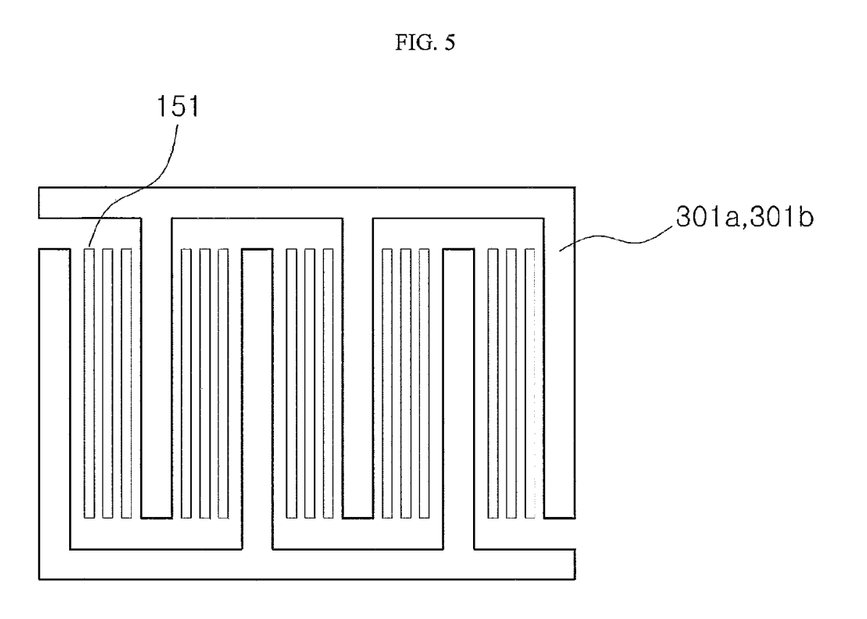
FIG. 5 is a plan view showing a flow channel supplying water vapor according to another embodiment of the present invention.
Figure 6:
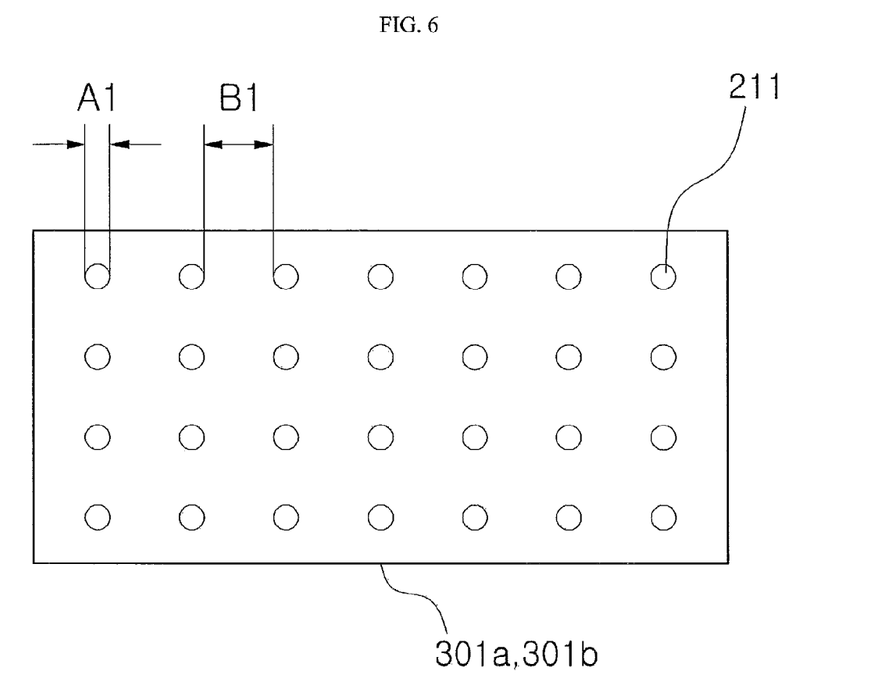
FIG. 6 is a plan view showing a water vapor discharge port according to an embodiment of the present invention.
Figure 7:
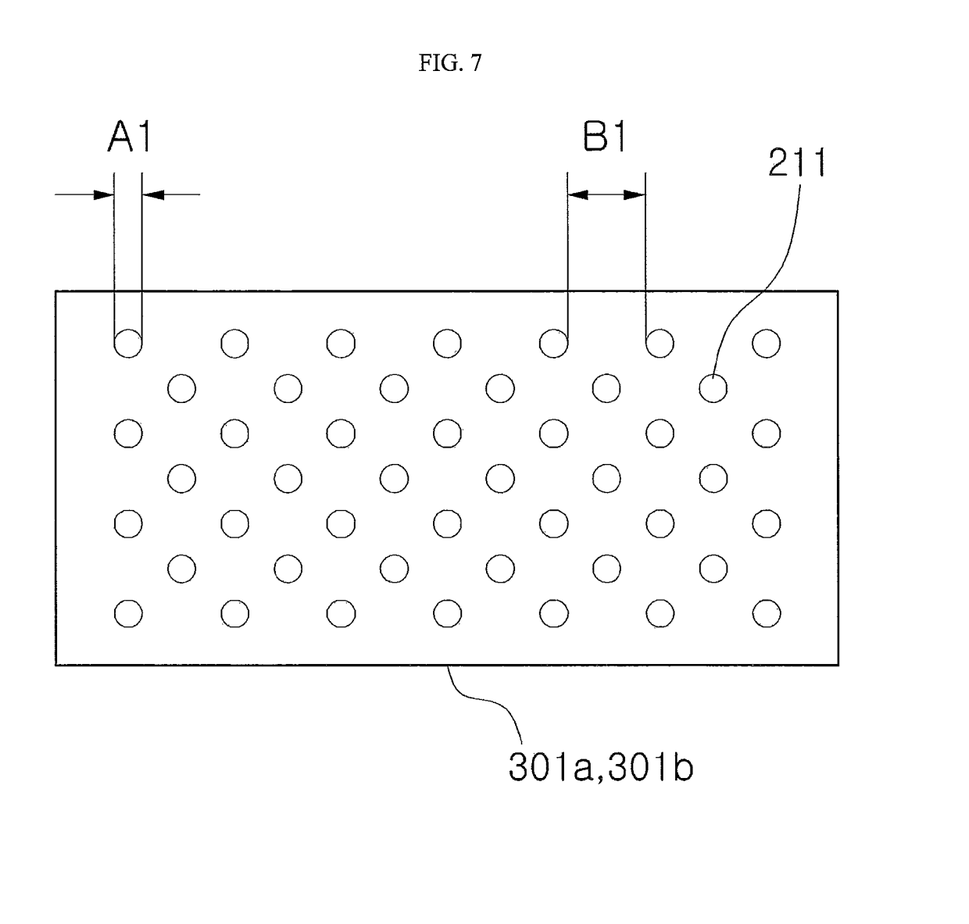
FIG. 7 is a plan view showing a water vapor discharge port according to another embodiment of the present invention.
Figure 8:
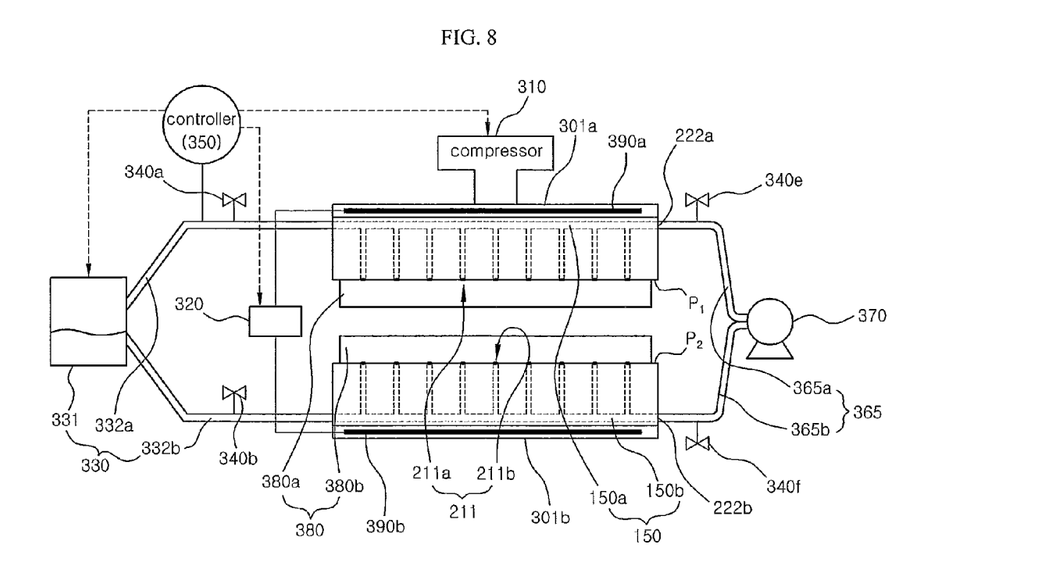
FIG. 8 shows an apparatus for pre-activating a polymer electrolyte fuel cell according to another embodiment of the present invention.
Figure 9:
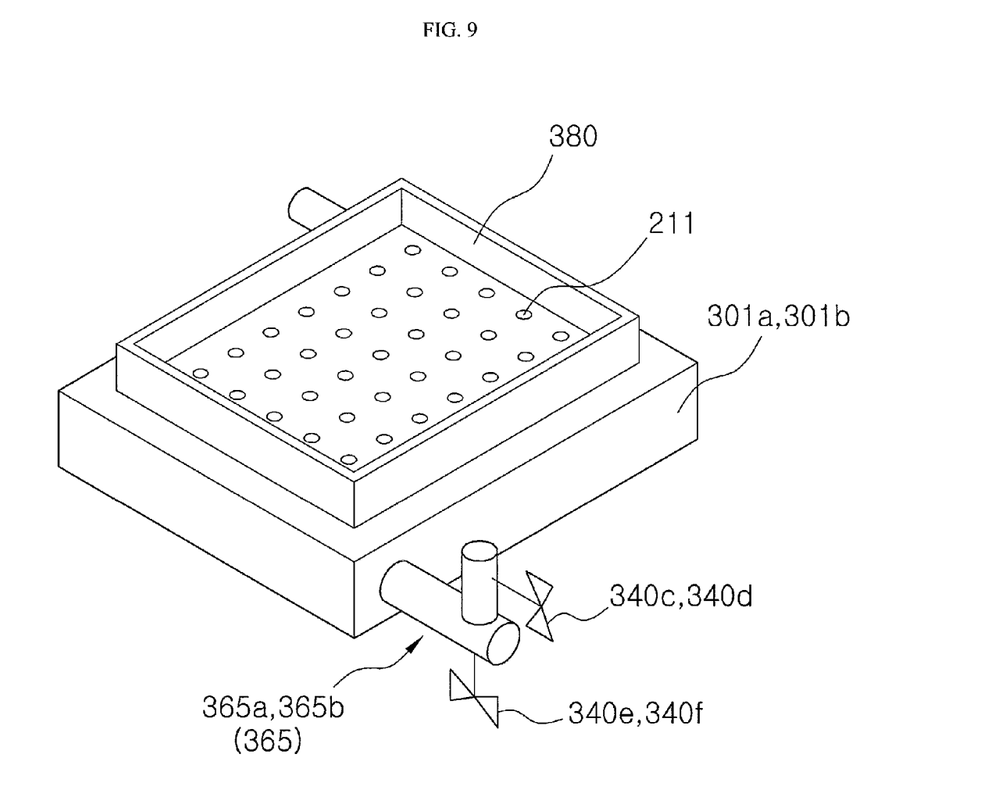
FIG. 9 is a perspective view showing a first plate or a second plate according to an embodiment of the present invention.
Figure 10:
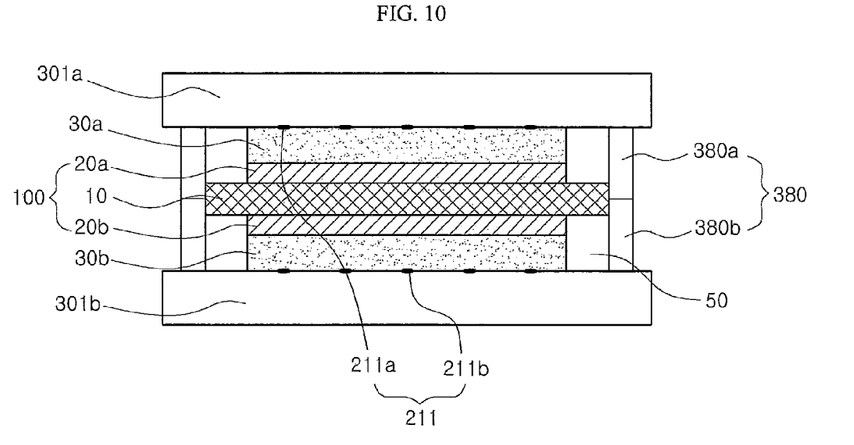
FIG. 10 is a cross-sectional view showing a unit cell stack with gas diffusion layers stacked on both sides of a membrane electrode assembly hot pressed between a first plate and a second plate of an apparatus for pre-activating a polymer electrolyte fuel cell according to an embodiment of the present invention.
Figure 11:
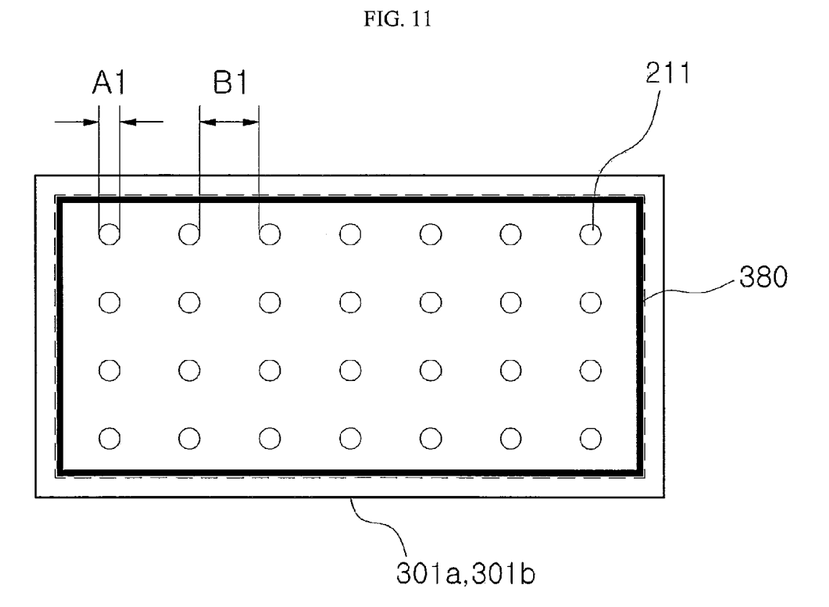
FIG. 11 is a plan view showing a water vapor discharge port according to still another embodiment of the present invention.
Figure 12:
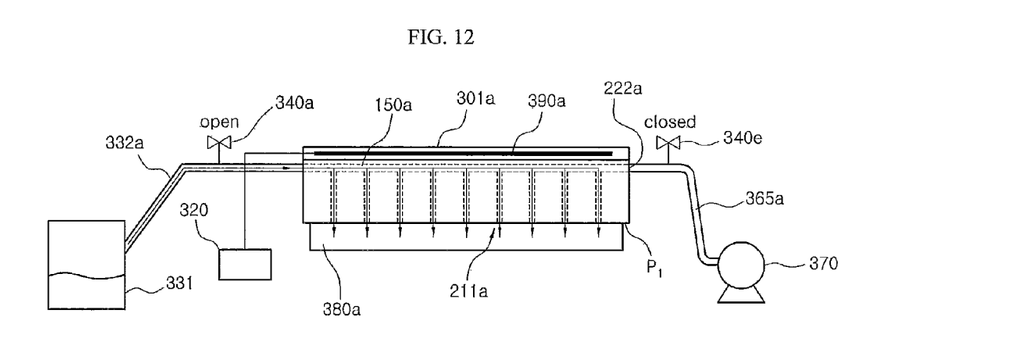
FIG. 12 shows a flow of water vapor in an apparatus for pre-activating a polymer electrolyte fuel cell according to an embodiment of the present invention.
Figure 13:
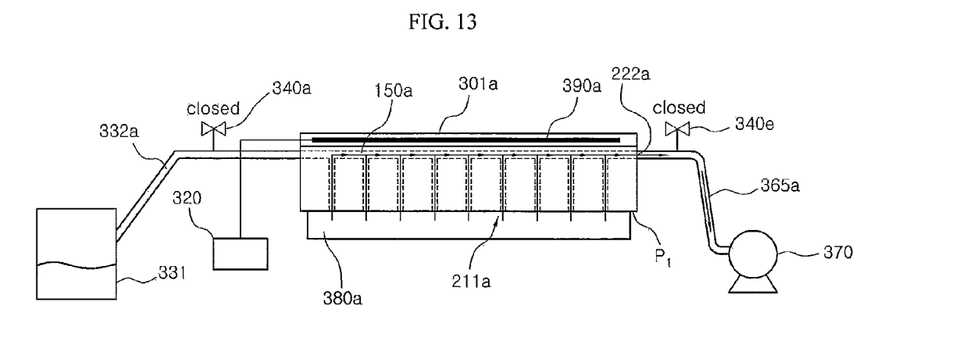
FIG. 13 shows a flow of gas depending on the control of vacuum state in an apparatus for pre-activating a polymer electrolyte fuel cell according to an embodiment of the present invention.

FIG. 3 shows an apparatus for pre-activating a polymer electrolyte fuel cell according to an embodiment of the present invention. FIG. 4 is a plan view showing a flow channel supplying water vapor according to an embodiment of the present invention. FIG. 5 is a plan view showing a flow channel supplying water vapor according to another embodiment of the present invention. FIG. 6 is a plan view showing a water vapor discharge port according to an embodiment of the present invention. FIG. 7 is a plan view showing a water vapor discharge port according to another embodiment of the present invention. FIG. 8 shows an apparatus for pre-activating a polymer electrolyte fuel cell according to another embodiment of the present invention. FIG. 9 is a perspective view showing a first plate or a second plate according to an embodiment of the present invention. FIG. 10 is a cross-sectional view showing a unit cell stack with gas diffusion layers stacked on both sides of a membrane electrode assembly hot pressed between a first plate and a second plate of an apparatus for pre-activating a polymer electrolyte fuel cell according to an embodiment of the present invention. FIG. 11 is a plan view showing a water vapor discharge port according to still another embodiment of the present invention. FIG. 12 shows a flow of water vapor in an apparatus for pre-activating a polymer electrolyte fuel cell according to an embodiment of the present invention. FIG. 13 shows a flow of gas depending on the control of vacuum state in an apparatus for pre-activating a polymer electrolyte fuel cell according to an embodiment of the present invention.

In accordance with the present invention, pre-activation is performed by hydrating a polymer electrolyte membrane included in a membrane electrode assembly and electrolytes to increase mobility of proton before assembling a polymer electrolyte fuel cell stack, thereby reducing activation time and stack production time.

The present invention provides an apparatus for pre-activating a polymer electrolyte fuel cell, which supplies water vapor while hot pressing a unit cell stack with gas diffusion layers stacked on both sides of a membrane electrode assembly comprising a polymer electrolyte membrane provided between two electrode catalyst layers to arrange and fix the membrane electrode assembly and the gas diffusion layers and perform pre-activation at the same time.

Referring to FIG. 3, an apparatus for pre-activating a polymer electrolyte fuel cell of the present invention is configured to perform pre-activation while an integrated body of a polymer electrolyte fuel cell membrane electrode assembly and gas diffusion layers is prepared. To this end, the apparatus for pre-activating a polymer electrolyte fuel cell comprises: a first plate 301*a* and a second plate 301*b* hot pressing the unit cell stack, each having a flow channel 150 supplying water vapor to opposing inner surfaces P1, P2 with the unit cell stack therebetween and comprising a resistor 390*a*, 390*b* producing heat in response to an electrical signal; a compressor 310 applying a pressure to the first plate 301*a* or the second plate 301*b*; a temperature controller 320 connected to the resistors 390*a*, 390*b* and controlling the temperature of the first plate 301*a* and the second plate 301*b*; and a water vapor supplier 330 connected to the flow channels 150 of the first plate 301*a* and the second plate 301*b* and supplying water vapor.

The apparatus for pre-activating a polymer electrolyte fuel cell of the present invention comprises the first plate 301*a* and the second plate 301*b* each having the flow channel 150 supplying water vapor to the inner surfaces P1, P2.

The inner surfaces P1, P2 refer to the opposing surfaces of the first plate 301*a* and the second plate 301*b* with the unit cell stack therebetween.

The flow channel 150 of each of the first plate 301*a* and the second plate 301*b* is formed to supply water vapor to the unit cell stack, and each of the flow channel 150 of the first plate 301*a* and the second plate 301*b* may comprise a water vapor inlet port through which water vapor is introduced from the water vapor supplier 330 and one or more water vapor discharge port(s) 211 through which water vapor is discharged.

The water vapor inlet port is formed at each of the flow channel 150 of the first plate 301*a* and the second plate 301*b*, and the flow channel 150 is connected to the water vapor supplier 330.

The water vapor discharge port 211 is provided at the inner surfaces P1, P2 of the first plate 301*a* and the second plate 301*b*.

The first plate 301*a* and the second plate 301*b* comprise the resistors 390*a*, 390*b* producing heat in response to an electrical signal. When an electrical signal is applied, the resistors 390a, 390b change the temperature of the first plate 301a and the second plate 301b by producing Joule heat.

The resistors 390a, 390b may be made of a commonly used resistor material that produces heat in response to an electrical signal electrical signal. Specifically, it may be made of a metal material such as Cr, Au, Ni, Ni/Cr, etc.

The apparatus for pre-activating a polymer electrolyte fuel cell of the present invention comprises the compressor 310. The compressor 310 applies a pressure to the first plate 301a or the second plate 301b.

The compressor 310 may be one commonly used in the related art without any limitation. Specifically, a hydraulic cylinder wherein a piston in a cylinder is moved by hydraulic pressure and a force is transferred to a connecting rod fixed to the piston may be used.

The apparatus for pre-activating a polymer electrolyte fuel cell of the present invention comprises the temperature controller 320. The temperature controller 320 is connected to the resistors 390a, 390b and controls the temperature of the first plate 301a and the second plate 301b.

The temperature controller 320 may comprise a temperature sensor measuring and displaying the temperature changed by the Joule heat produced as an electrical signal is applied to the resistors 390a, 390b. The temperature sensor may be one commonly used in the related art and is not particularly limited.

The apparatus for pre-activating a polymer electrolyte fuel cell of the present invention comprises the water vapor supplier 330. The water vapor supplier 330 water vapor supplier comprises a water vapor generator 331 generating water vapor and connection pipes 332a, 332b respectively connecting the water vapor generator 331 to the flow channels 150 of the first plate 301a and the second plate 310b and supplying the water vapor generated from the water vapor generator 331 to the flow channels 150 of the first plate 301a and the second plate 310b. The apparatus for pre-activating a polymer electrolyte fuel cell comprises valves 340a, 340b regulating the pressure of the connection pipes 332a, 332b.

The water vapor generator 331 vaporizes water to generate water vapor. The water vapor generated from the water vapor generator 331 is respectively supplied to the flow channels 150 of the first plate 301a and the second plate 310b through the connection pipes 332a, 332b.

The valves 340a, 340b are located at arbitrary positions of the connection pipes 332a, 332b to regulate the pressure of the water vapor.

Preferably, the valves 340a, 340b are respectively provided at the locations of the connection pipes 332a, 332b where they are in contact with the water vapor inlet ports of the flow channels 150 of the first plate 301a and the second plate 301b for easier control of the water vapor supplied to the flow channels 150.

Referring to FIG. 4, the flow channels 150 supplying the water vapor are respectively provided in the first plate 301a and the second plate 301b, and may have a serpentine shape bending repeatedly from the water vapor inlet port to the end of the first plate 301a or the second plate 301b. The serpentine shape of the flow channel 150 allows the water vapor to be supplied uniformly over a wide area.

Referring to FIG. 5, the flow channel 150 may have a semi-serpentine shape 151. The semi-serpentine shape 151 wherein a plurality of parallel paths bend repeatedly may resolve the problem of increased power consumption for supplying the water vapor when a large pressure drop occurs in the serpentine-shaped flow channel 150.

The water vapor discharge port 211 is a hole through which the water vapor is discharged after passing through the flow channels 150 of the first plate 301a and the second plate 301b. One or more of the water vapor discharge port 211 is formed at the inner surfaces P1, P2 where the first plate 301a and the second plate 301b come into contact with the unit cell stack.

Referring to FIG. 6, a plurality of the water vapor discharge ports 211 may be arranged with regular diameters A1 and intervals B1.

Referring to FIG. 7, a plurality of the water vapor discharge ports 211 may be arranged with regular diameters A1 and intervals B1, with four water vapor discharge ports 211 arranged in the form of a rectangle and one water vapor discharge port 211 at the center thereof as a base unit.

Referring to FIG. 8, the apparatus for pre-activating a polymer electrolyte fuel cell of the present invention may further comprise a controller 350. The controller 350 controls the compressor 310, the temperature controller 320 and the water vapor supplier 330, and may be one commonly used in the related art without limitation.

The controller 350 controls the temperature controllers 320a, 320b respectively connected to the resistors 390a, 390b and controls the temperature of the first plate 301a and the second plate 301b.

At the same time, the controller 350 controls the compressor 310 to apply pressure to the first plate 301a or the second plate 301b.

Further, the controller 350 controls the water vapor generator 331 of the water vapor supplier 330 so that water is vaporized by the water vapor generator 331 to generate water vapor. The water vapor from the water vapor generator 331 is connected respectively to the flow channels 150 of the first plate 301a and the second plate 301b through the connection pipes 332a, 332b.

The apparatus for pre-activating a polymer electrolyte fuel cell of the present invention designed to supply water vapor is capable of hydrating the polymer electrolyte membrane included in the membrane electrode assembly and electrolytes, thereby increasing mobility of proton. As a result, a pre-activated integrated body of the polymer electrolyte fuel cell membrane electrode assembly and the gas diffusion layers may be prepared.

Further, by assembling the polymer electrolyte fuel cell stack using the pre-activated integrated body of the membrane electrode assembly and the gas diffusion layers, time and energy required for activation of the stack may be saved.

In the apparatus for pre-activating a polymer electrolyte fuel cell of the present invention, each of the flow channels 150 of the first plate 301a and the second plate 301b further has a first discharge port 222a, 222b in addition to the one or more water vapor discharge port(s) 211 discharging water vapor, and the first discharge port 222a, 222b is connected to a vacuum pump 370 via a vacuum pipe 365 equipped with a vacuum valve 340e, 340f.

Impurities included during the preparation of the membrane electrode assembly and excess water in the unit cell stack is discharged by the vacuum pump 370 respectively through the water vapor discharge ports 211 and the flow channels 150 of the first plate 301a and the second plate 301b to the first discharge ports 222a, 222b, and then removed.

The valve 340e, 340f is located at arbitrary position of the vacuum pipe 365 to regulate the pressure of the fluid transferred by the vacuum pump 370.

The vacuum pump 370 and the vacuum pipe 365 may be any one commonly used in the related art and are not particularly limited.

The apparatus for pre-activating a polymer electrolyte fuel cell of the present invention further comprises a sealer 380 sealing the space on either side of the polymer electrolyte membrane, where the electrode catalyst layer and the gas diffusion layers of the unit cell stack are stacked during the hot pressing, at the inner surface P1, P2 of the first plate 301a and the second plate 301b.

Referring to FIG. 9, the sealer 380 is formed by four sealing members in rectangular plate form on the inner surfaces P1, P2 of the first plate 301a and the second plate 301b.

The sealer 380 is provided to control the unit cell stack in the sealing area enclosed by the sealer 380 in vacuum state.

The sealer 380 may be formed of a dry type sealing member prepared from elastic polymer or synthetic rubber as main constituent and is not particularly limited.

The vacuum pipe 365 where the vacuum valve 340e, 340f is equipped may be equipped with a ventilation pipe and a ventilation port for ventilation. The ventilation pipe may be equipped with a ventilation valve 340c, 340d.

The ventilation pipe is connected to the atmosphere such that the vacuum state of the ventilation pipe may be released by controlling the ventilation valve 340c, 340d.

Referring to FIG. 10, while the apparatus for pre-activating a polymer electrolyte fuel cell of the present invention is hot pressed and subjected to a vacuum state the sealer 380a of the first plate 301a is precisely matched to the sealer 380b of the second plate 301b to form a sealed space, and the unit cell stack is located in the spaced sealed by the sealer 380 in vacuum state.

To describe in more detail, the apparatus for pre-activating a polymer electrolyte fuel cell controls the unit cell stack to be exposed to vacuum state by controlling the pressure in the sealing area.

The unit cell stack comprises the gas diffusion layers 30a, 30b stacked on both sides of the membrane electrode assembly 100 comprising the polymer electrolyte membrane 10 provided between the two electrode catalyst layers, i.e. the cathode 20b and the anode 20a.

In the membrane electrode assembly 100, the cathode 20b and the anode 20a are attached on either side of the polymer electrolyte membrane 10. And, the gas diffusion layers 30a, 30b are simply stacked on both sides of the membrane electrode assembly 100.

The hot pressing of the unit cell stack results in a conventional unit fuel cell. In the unit cell, the fuel electrode which contacts hydrogen comprises the anode 20a and the gas diffusion layer 30a provided beside the anode 20a, and the air electrode which contacts oxygen or air comprises the cathode 20b and the gas diffusion layer 30b provided beside the cathode 20b.

Hereinafter, description will be made referring to the side of the anode 20a and the gas diffusion layer 30a as a fuel electrode side and the side of the cathode 20b and the gas diffusion layer 30b as an air electrode side, with respect to the polymer electrolyte membrane 10 of the unit cell stack.

The terms fuel electrode side and air electrode side as used in the present invention are distinguished from the fuel electrode and the air electrode of the unit cell in that the membrane electrode assembly 100 and the gas diffusion layers 30a, 30b of the unit cell stack are not joined integrally. The terms were selected to more clearly describe the technical feature of the present invention.

Preferably, a gasket 50 may be provided at the unit cell stack loaded in the sealer 380 or the both ends of the polymer electrolyte membrane 10 may come in contact with the sealer 380 to separate the spaces at the fuel electrode side and the air electrode side so as to regulate the degree of vacuum at the fuel electrode side and the air electrode side differently.

Referring to FIG. 11, a plurality of the water vapor discharge ports 211 may be arranged with regular diameters A1 and intervals B1 in the space formed by the first plate 301a, the second plate 301b and the sealer 380.

With such a configuration, the apparatus for pre-activating a polymer electrolyte fuel cell of the present invention supplies water vapor while hot pressing the unit cell stack with the gas diffusion layers 30a, 30b stacked on both sides of the membrane electrode assembly 100 including the polymer electrolyte membrane provided between the two electrode catalyst layers to arrange and fix the membrane electrode assembly 100 and the gas diffusion layers 30a, 30b, and performs pre-activation at the same time.

The path through which the water vapor is supplied for pre-activation will be described referring to FIG. 12. The water vapor generator 331 vaporizes water to generate water vapor. The water vapor generated from the water vapor generator 331 is supplied through the connection pipe 332a to the flow channel 150a of the first plate 301a. Then, the water vapor is discharged through the water vapor discharge port 211a formed at the first plate 301a as indicated by the solid arrows, and is uniformly supplied to the unit cell stack.

At this time, the valve 340a at the connection pipe 332a connected to the water vapor generator 331 and the flow channel 150a of the first plate 301a is open, and the vacuum valve 340e at the vacuum pipe 365a connected to the first discharge port 222a of the channel 150a of the first plate 301a is closed.

The path through which the water vapor is supplied at the second plate 301b is similar to that through which the water vapor is supplied at the second plate first plate 301a.

The flow of gas for controlling the vacuum state will be described referring to FIG. 13. By the operation of the vacuum pump 370, the gas inside the sealer 380a is transferred through the one or more water vapor discharge port(s) 211a of the first plate 301a to the vacuum pump 370, after passing through the flow channel 150a of the first plate 301a.

At this time, valve 340a at the connection pipe 332a connected to the water vapor generator 331 and the flow channel 150a of the first plate 301a is closed, and the vacuum valve 340e at the vacuum pipe 365a connected to the first discharge port 222a of the channel 150a of the first plate 301a is open.

The flow of gas at the second plate 301b is similar to that through at the second plate first plate 301a.

As such, the flow channel 150 serves as a path for supplying the water vapor to the unit cell stack, and also as a path of the gas for controlling the sealing area in vacuum state.

The apparatus for pre-activating a polymer electrolyte fuel cell may control the degree of vacuum of the fuel electrode side and the air electrode side differently. As such, the leakage of the membrane electrode assembly 100 resulting from a physical damage of the membrane electrode assembly 100 may be detected from the change of the degree of vacuum of the fuel electrode side and the air electrode side before assembling the stack.

For example, in a first stage, the vacuum pump 370 is operated such that the degree of vacuum of the fuel electrode side and the air electrode side is set differently, respectively at 0.1 bar and 0.05 bar. In a second stage, the change of the degree of vacuum of the fuel electrode side and the air electrode side is checked within 3 minutes. In a third stage, the polymer electrolyte fuel cell membrane electrode assembly 100 whose membrane electrode assembly 100 is leaking is detected.

In the first stage, the vacuum valve 340e, 340f of the vacuum pipe 365 connected to the vacuum pump 370 may be controlled to set the degree of vacuum of the fuel electrode side and the air electrode side differently with respect to the polymer electrolyte membrane 10 of the unit cell stack provided in the sealer 380.

In the second stage, the valves 340a, 340b at the connection pipes 332a, 332b of the water vapor supplier 330 and the vacuum valves 340e, 340f of the vacuum pipes 365 connected to the first discharge ports 222a, 222b of the flow channels 150 of the first plate 301a and the second plate 301b are closed. The change of the degree of vacuum can be checked using a pressure gauge connected to the sealers 380 at the fuel electrode side and the air electrode side and capable of measuring and displaying pressure. The pressure gauge may be one commonly used in the related art without limitation.

In the second stage, if the pressure of the fuel electrode side remains unchanged but the pressure of the air electrode side increases to 0.07 bar, it is determined that the polymer electrolyte membrane 10 of the membrane electrode assembly 100 is normal but leakage occurs from out of the air electrode side.

In the second stage, if the pressure of the air electrode side remains unchanged but the pressure of the fuel electrode side increases to 0.12 bar, it is determined that the polymer electrolyte membrane 10 of the membrane electrode assembly 100 is normal but leakage occurs from out of the fuel electrode side.

And, if the pressure of the fuel electrode side decreases to 0.75 bar and the pressure of the air electrode side increases to 0.75 bar, it is determined that leakage occurs because of the damage of the polymer electrolyte membrane 10 of the membrane electrode assembly 100 although there is no leakage from out of the fuel electrode side and the air electrode side.

As described, the apparatus for pre-activating a polymer electrolyte fuel cell of the present invention is capable of detecting the leaking membrane electrode assembly 100 in advance based on the change of the degree of vacuum of the fuel electrode side and the air electrode side. As a result, the efforts and energy of disassembling the entire stack which is found to be defective during the activation process may be saved.

Further, the apparatus for pre-activating a polymer electrolyte fuel cell of the present invention is capable of removing impurities included during the preparation of the membrane electrode assembly 100 and excess water included in the membrane electrode assembly 100 by controlling vacuum state of the fuel electrode side and the air electrode side.

When performing hot pressing using the apparatus for pre-activating a polymer electrolyte fuel cell of the present invention, the temperature of the first plate 301a and the second plate 301b may be 70 to 150° C., and the pressure applied by the compressor 310 may be 10 to 200 atm based on the active area of the membrane electrode assembly 100. The hot pressing may be performed for 1 to 20 minutes.

The temperature 70 to 150° C. is a temperature range where the membrane electrode assembly 100 and the gas diffusion layers 30a, 30b are joined integrally by the hot pressing.

During the hot pressing, the controller 350 controls the temperature controller 320 which is connected to the resistors 390a, 390b. If the temperature of the temperature controller 320 is set at 70 to 150° C., when an electrical signal is applied to the resistors 390a, 390b, the temperature controller 320 controls so that Joule heating occurs until the temperature of the first plate 301a and the second plate 301b reaches 70 to 150° C. The temperature sensor measures and displays the temperature of the first plate 301a and the second plate 301b.

At the same time, the controller 350 controls the compressor 310 to apply a pressure of 10 to 200 atm to the first plate 301a or the second plate 301b for 1 to 20 minutes so as to compress the unit cell stack.

The magnitude of the pressure applied by the compressor 310 is determined depending on the active area of the membrane electrode assembly 100. The active area of the membrane electrode assembly 100 varies up to 500 cm$^2$ depending on its use.

The magnitude of the pressure required to integrally join the unit cell stack may also vary depending on the membrane electrode assembly 100 and the gas diffusion layers 30a, 30b.

The present invention also provides an integrated body of the polymer electrolyte fuel cell membrane electrode assembly 100 and the gas diffusion layers 30a, 30b pre-activated using the apparatus for pre-activating a polymer electrolyte fuel cell according to the present invention.

The integrated body of the polymer electrolyte fuel cell membrane electrode assembly 100 and the gas diffusion layers 30a, 30b is one pre-activated by supplying water vapor. The pre-activation is preformed by hydrating the polymer electrolyte membrane 10 included in the membrane electrode assembly 100 and electrolytes so as to increase mobility of proton.

The present invention further provides a polymer electrolyte fuel cell stack assembled by stacking a plurality of the integrated bodies of the membrane electrode assembly 100 and the gas diffusion layers 30a, 30b.

The polymer electrolyte fuel cell stack is distinguished from a polymer electrolyte fuel cell stack before carrying out activation, and is a stack assembled by stacking a plurality of the integrated bodies of the membrane electrode assembly 100 and the gas diffusion layers 30a, 30b using the apparatus for pre-activating a polymer electrolyte fuel cell of the present invention.

While the present invention has been described with respect to the specific embodiments, it will be apparent to those skilled in the art that various changes and modifications may be made without departing from the spirit and scope of the invention as defined in the following claims.

What is claimed is:

1. An apparatus for pre-activating a polymer electrolyte fuel cell, which supplies water vapor while hot pressing a unit cell stack with gas diffusion layers stacked on both sides of a membrane electrode assembly comprising a polymer electrolyte membrane provided between two electrode catalyst layers to fix the gas diffusion layers arranged on both sides of the membrane electrode assembly and perform pre-activation at the same time, wherein the apparatus comprises a first plate and a second plate hot pressing the unit cell stack, each having a flow channel supplying water vapor to opposing inner surfaces with the unit cell stack therebetween and comprising a resistor producing heat in response to an electrical signal; a compressor connected to the first plate or the second plate and applying a pressure to the first plate or the second plate; a temperature controller connected to the resistors and controlling the temperature of the first plate and the second plate; and a water vapor supplier connected to the flow channels of the first plate and the second plate and supplying water vapor.

2. The apparatus for pre-activating a polymer electrolyte fuel cell according to claim 1, wherein the water vapor supplier comprises a water vapor generator generating water vapor and connection pipes respectively connecting the water vapor generator to the flow channels of the first plate and the second plate and supplying the water vapor generated from the water vapor generator to the flow channels of the first plate and the second plate, and the apparatus for pre-activating a polymer electrolyte fuel cell comprises valves regulating the pressure of the connection pipes.

3. The apparatus for pre-activating a polymer electrolyte fuel cell according to claim 1, wherein each of the flow channels of the first plate and the second plate has one or more water vapor discharge port(s) discharging water vapor to the inner surface and further has a first discharge port in addition to the one or more water vapor discharge port(s), and the first discharge port is connected to a vacuum pump via a vacuum pipe equipped with a vacuum valve.

4. The apparatus for pre-activating a polymer electrolyte fuel cell according to claim 1, which further comprises a sealer sealing the space on either side of the polymer electrolyte membrane, where the electrode catalyst layer and the gas diffusion layers of the unit cell stack are stacked during the hot pressing, at the inner surface of the first plate and the second plate.

5. The apparatus for pre-activating a polymer electrolyte fuel cell according to claim 1, which further comprises a controller controlling the compressor, the temperature controller and the water vapor supplier.

6. The apparatus for pre-activating a polymer electrolyte fuel cell according to claim 1, wherein the pre-activation comprises removal of impurities included during the preparation of the membrane electrode assembly and hydration of the polymer electrolyte membrane included in the membrane electrode assembly and electrolytes to increase mobility of protons.

7. The apparatus for pre-activating a polymer electrolyte fuel cell according to claim 1, wherein the temperature of the first plate and the second plate during the hot pressing is 70 to 150° C., the pressure applied by the compressor is 10 to 200 atm based on the active area of the membrane electrode assembly, and the hot pressing is performed for 1 to 20 minutes.

8. An integrated body of a polymer electrolyte fuel cell membrane electrode assembly and gas diffusion layers pre-activated using the apparatus for pre-activating a polymer electrolyte fuel cell according to claim 1.

9. An integrated body of a polymer electrolyte fuel cell membrane electrode assembly and gas diffusion layers pre-activated using the apparatus for pre-activating a polymer electrolyte fuel cell according to claim 2.

10. An integrated body of a polymer electrolyte fuel cell membrane electrode assembly and gas diffusion layers pre-activated using the apparatus for pre-activating a polymer electrolyte fuel cell according to claim 3.

11. An integrated body of a polymer electrolyte fuel cell membrane electrode assembly and gas diffusion layers pre-activated using the apparatus for pre-activating a polymer electrolyte fuel cell according to claim 4.

12. An integrated body of a polymer electrolyte fuel cell membrane electrode assembly and gas diffusion layers pre-activated using the apparatus for pre-activating a polymer electrolyte fuel cell according to claim 5.

13. A polymer electrolyte fuel cell stack assembled by stacking a plurality of the integrated bodies of the membrane electrode assembly and the gas diffusion layers according to claim 8.

14. A polymer electrolyte fuel cell stack assembled by stacking a plurality of the integrated bodies of the membrane electrode assembly and the gas diffusion layers according to claim 9.

15. A polymer electrolyte fuel cell stack assembled by stacking a plurality of the integrated bodies of the membrane electrode assembly and the gas diffusion layers according to claim 10.

16. A polymer electrolyte fuel cell stack assembled by stacking a plurality of the integrated bodies of the membrane electrode assembly and the gas diffusion layers according to claim 11.

17. The apparatus for pre-activating a polymer electrolyte fuel cell according to claim 3, which controls the degree of vacuum of a fuel electrode side and an air electrode side differently, whereby the leakage of the membrane electrode assembly resulting from a physical damage of the membrane electrode assembly is detected from the change of the degree of vacuum of the fuel electrode side and the air electrode side.

18. The apparatus for pre-activating a polymer electrolyte fuel cell according to claim 17, wherein the vacuum pump is operated such that the degree of vacuum of the fuel electrode side and the air electrode side is set differently and wherein a pressure gauge detects the change of the degree of vacuum of the fuel electrode side and the air electrode side to detect the leakage of the membrane electrode assembly.

19. The apparatus for pre-activating a polymer electrolyte fuel cell according to claim 17, which performs the process comprising of:
   setting the degree of vacuum of the fuel electrode side and the air electrode side differently;
   checking the change of the degree of vacuum of the fuel electrode side and the air electrode side is checked within 3 minutes; and
   detecting the leakage of the polymer electrolyte fuel cell membrane electrode assembly.

* * * * *